Feb. 3, 1970     W. C. BERRY, JR     3,493,422
APPARATUS AND PROCESS FOR LIQUID TREATMENT OF SHAPED STRUCTURES
Filed Feb. 28, 1967                                                    2 Sheets-Sheet 1
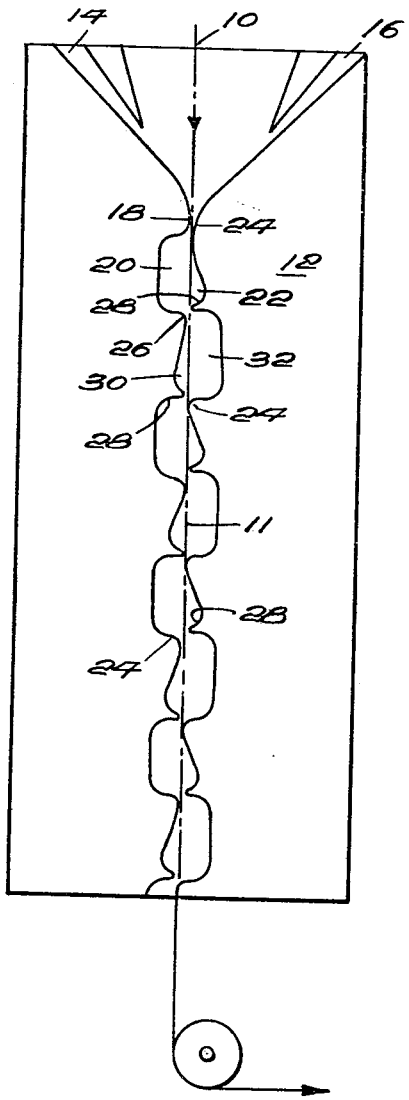
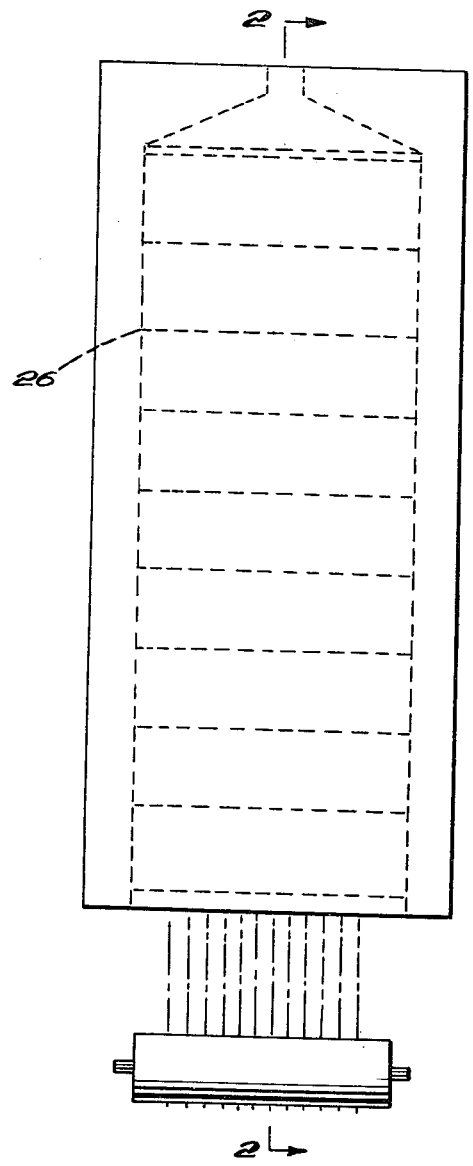

Feb. 3, 1970 W. C. BERRY, JR 3,493,422
APPARATUS AND PROCESS FOR LIQUID TREATMENT OF SHAPED STRUCTURES
Filed Feb. 28, 1967 2 Sheets-Sheet 2
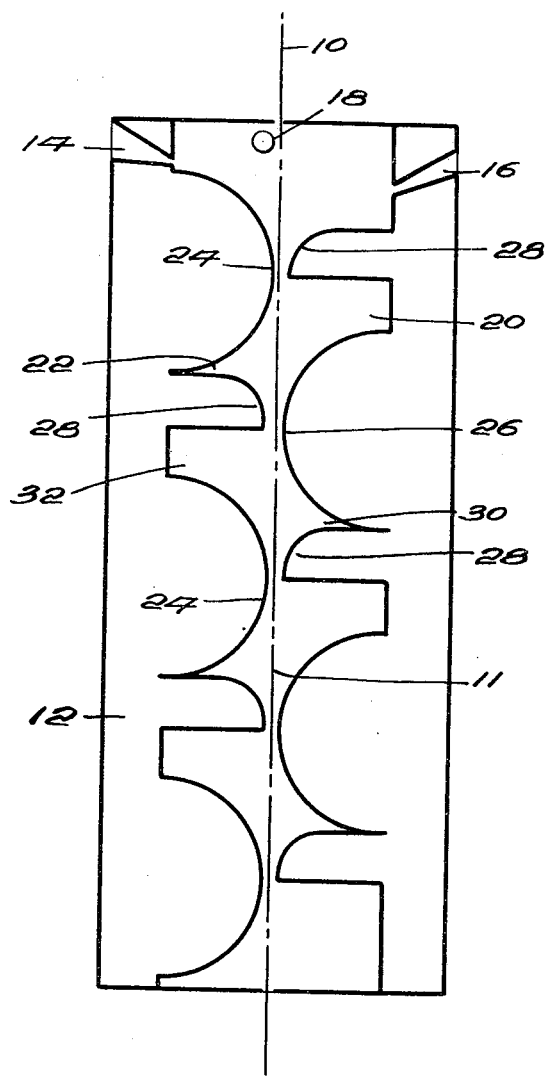

United States Patent Office 3,493,422
Patented Feb. 3, 1970

---

3,493,422
APPARATUS AND PROCESS FOR LIQUID TREATMENT OF SHAPED STRUCTURES
Walter C. Berry, Jr., Staunton, Va., assignor to E. I. du Pont de Nemours and Company, Wilmington, Del., a corporation of Delaware
Filed Feb. 28, 1967, Ser. No. 619,247
Int. Cl. B05c 11/02
U.S. Cl. 117—102                                    6 Claims

---

ABSTRACT OF THE DISCLOSURE

Apparatus and process for efficient heat and/or mass transfer between shaped structures and liquid by sequentially contacting a moving shaped structure with liquid and forwarding it, after each contact, in close proximity to a liquid stripping device oriented adjacent to and extending substantially perpendicular to the path of travel of said shaped structure, said stripping device having at least one convex curvature in its cross-sectional contour extending downstream of the point of closest proximity to said path of travel.

---

BACKGROUND

This invention relates to process and apparatus for liquid treatment of shaped structures and more particularly to apparatus and process for improved efficiency in repetitively contacting continuous, moving structures with a liquid treating agent.

In the manufacture of shaped, continuous structures such as films, fabrics, filaments and aggregations of filaments such as yarns and tows it frequently is necessary to contact such structures with a liquid treating agent so as to thoroughly coat the surface of all members of the aggregation or to effect a change in temperature thereof. Such processes are exemplified by extraction of a solvent, scouring to remove sizes or finishes, dyeing, hot-drawing or cooling of freshly spun filaments. In many such continuous, or repetitive-continuous processes, it is recognized that displacement of the film of liquid present initially, or added in a previous, repetitive operation, is a major rate-limiting factor. Even at speeds which result in turbulence at or near the surface of the shaped structure, the adherent film is replaced only slowly. A means for efficient stripping and reapplication between stages of liquid-agent contacting would increase rate of heat and/or mass transfer between shaped structure and liquid and, in general, be highly beneficial to economy in a variety of processes involving liquid treatment of continuous shaped structures.

SUMMARY OF THE INVENTION

This invention provides apparatus and process for efficient heat and/or mass transfer between shaped structure and liquid. It further provides efficient means for liquid treatment of continuous, shaped structures.

These and other advantages are provided in the apparatus and process of this invention for liquid treatment of moving shaped structures of the class consisting of films, foils, filaments, yarns, tows and fabrics by sequentially contacting said shaped structure with liquid treating agent in excess of that which is rapidly and completely absorbed, forwarding the liquid-bearing shaped structure, after each of such contacts, in close proximity to a liquid stripping device oriented adjacent to and extending substantially perpendicular to the path of travel of said shaped structure, each of said stripping devices having at least one convex curvature in its cross-sectional contour extending downstream from the point of closest proximity to said path of travel. After each stripping step but the last, additional surfaces, disposed opposite each stripping device for close, cooperating relationship therewith, redirect the stripped liquid toward the path of travel to afford renewed turbulent contact with the structure. The essential requirement is the positioning of the said convex surface adjacent to the moving shaped structure at a distance no greater than one which will result in engagement of the film of liquid carried on the shaped structure by the liquid-stripping device, whereupon a substantial proportion of the liquid is forcibly stripped from the moving shaped structure. For efficiency of construction and operation, all stripping devices and additional surfaces are preferably part of a unitary structure through which the moving shaped structure advances.

BRIEF DESCRIPTION OF THE DRAWINGS

The invention will more readily be understood by reference to the drawings in which:

FIGURE 1 is a schematic elevation view of one preferred embodiment;

FIGURE 2 is a cross-sectional elevation view taken along line 2—2 of FIGURE 1 in which the liquid treating agent flows concurrently with the multifilament yarn, and in which the principle advantages are found in the uniformity of treatment afforded each filament such as rapid uniform heat or mass transfer; and FIGURE 3 illustrates a second preferred embodiment which is functionally similar to that of FIGURES 1 and 2, but which has advantages in ease of fabrication and lower tension drag on yarn processed therethrough. It has been found that this embodiment is the full equivalent of the first embodiment in efficiency of liquid contact with shaped structure treated therewith. Its operation is exactly analogous to that of the apparatus of FIGURES 1 and 2, described below.

DETAILED DESCRIPTION OF PREFERRED EMBODIMENTS

With reference to the embodiment of FIGURES 1 and 2, yarn 10, illustrated by dotted lines (from source not shown), proceeds downwardly through passageway 11 of unitary treatment device 12. Excess treating liquid (from source not shown) is introduced through one or both of ports 14 and 16, which terminate as slots as long as the spread of yarn 10, which is flattened as it contacts the first guide surface 18. After initial contact with the yarn, the treating liquid is forcibly deflected into recess 22 by the pumping action of the advancing yarn as it engages liquid stripping device 24 and, in this embodiment, by gravity. In the specific illustration of this apparatus, additional cooperating surface 28 serves to redirect the stripped liquid in recess 22 toward the yarn path. The liquid is then forcibly deflected into recess 30, and the process repeats for each subsequent stage. The emerging yarn is directed to further processing steps not shown, and the effluent liquid treating agent is collected, also by means not shown, for recycling to ports 14 and/or 16 or for other disposition. It will be obvious that in treatment of impervious structures such as films the treating liquid must be added at both ports 14 and 16 if both sides are to be treated, and that the two streams will merge very slightly if at all.

The operation of the embodiment of FIGURE 3 is the same as for FIGURES 1 and 2, and the corresponding elements of the two embodiments are given the same numbers. The primary distinction between the embodiments lie in the shape of the cross-sectional contour of additional cooperating surface 28 and in the simpler construction of that depicted as FIGURE 3. In the embodiment of FIGURES 1 and 2, cooperating surface 28 has a concave curvature in its cross-sectional contour extending upstream from the point of closest proximity to the path of travel of yarn 10 while the corresponding cross-sectional contour in FIGURE 3 is convex. The lower turbulence of reapplication with this embodiment creates less tension drag for certain applications but is equally efficient, further illustrating the importance of the liquid-stripping aspects of this invention.

Although the dimensions of the apparatus may be modified somewhat to meet the demands of various processes, it generally is preferable that the radii of curvature of the stripping contours indicated at 24 in both embodiments should be in the range of from about 0.5 to about 2.0 inches. In the case of the embodiment of FIGURE 3, opposing contour 28 should have about 0.4 to about 0.6 times the radius of curvature of surface 24 for best efficiency of stripping. The clearance between surfaces 24 and 28 will vary with the shaped structure and liquid employed, but is generally in the range of from about .020 to .065 inch for most textile denier applications. Large bundles such as high denier tows will require larger openings.

The efficiency of liquid-to-yarn contact afforded by apparatus such as illustrated in the embodiment of FIGURES 1 and 2 is seen in comparative tests involving dry-spinning of 600-filament yarn from an aromatic polyamide such as described in Kwolek et al., U.S. Patent No. 3,063,966. As the hot filaments emerge from the spinning cell, in which they are subjected to a flow of inert gas heated to the range of 300 to 350° C., they are in one case passed through a funnel into the top of which is added water at the rate of 8 pounds per pound of yarn. The outlet of the funnel is of such size that it is flooded with water at all times, providing a continuous bath of liquid through which the yarn passes. This part of the test is taken as a comparison for the second part in which the yarn is passed through the apparatus of the embodiment of FIGURES 1 and 2 concurrently with 8 pounds of water per pound of yarn. In each case, the filament speed is 150 yards per minute.

As the filaments emerge from the spinning cell, they are found to contain 36% polymer, 16% calcium chloride (a by-product of polymer preparation and a solvating agent) and 48% dimethyl acetamide (the solvent employed for spinning). The following table summarizes the results of this comparative test. Coefficients of variation in denier and elongation are determined by measurements on 50 filaments from each test.

| Spun and water treated yarn composition | Funnel | Apparatus of FIGS. 1 and 2 |
|---|---|---|
| Percent Polymer | 26 | 26 |
| Percent CaCl$_2$ | 7 | 7 |
| Percent Dimethyl-acetamide | 21 | 21 |
| Percent Water | 46 | 46 |
| Mechanical defects per 1,000 yards (after drawing) | 20 | 8 |
| Denier-per filament (after drawing 9.0 denier per filament spun yarn to 450 percent of its as spun yarn length) | 2.1 | 2.1 |
| Coefficient of denier variation (percent) | 16 | 10 |
| Yarn elongation | 31.2 | 33.4 |
| Coefficient of elongation variation | 16 | 10 |

The improved uniformity of treatment filament-to-filament is evident in the lower variation of both denier and elongation. It is also seen that the yarn is tougher after this more uniform and more thorough treatment as evidenced by the fewer mechanical defects after drawing. The defects observed here are primarily broken filaments. The funnel apparatus leads to fluff balls consisting of one or more broken filaments which have stripped back.

It is obvious that the described embodiments are advantageously suited for processing of filaments since they assume the added liquid can pass freely through the sheet. The versatility of the liquid stripper of this invention for use with films or foils will be seen, however, in its ability to remove liquid effectively from either side of continuous shaped structures which are moving in a path of any inclination. The device may be mounted to provide approach of liquid strippers to both sides of films or foils emerging from a liquid bath. Alternatively, liquid treating agents may be added to both sides of the moving continuous structure, in the manner described above. In some cases it may be advantageous to employ a combination of baths and liquid treatments on-the-run by use of sprays or other means of liquid application.

What is claimed is:

1. Apparatus for treating a shaped structure being forwarded downwardly in a linear path of travel comprising a unitary structure having (a) means for initially contacting said shaped structure with an excess of liquid; (b) a passageway therethrough for said shaped structure; (c) a plurality of liquid stripping devices located along opposite sides of said passageway, each of said stripping devices being oriented adjacent to and extending substantially perpendicular to said passageway for sequentially stripping excess liquid away from said shaped structure, each of said stripping devices having at least one convex curature in its cross-sectional contour extending downstream from the point of closest proximity to said path of travel; and (d) additional contoured surfaces continuing from each of said stripping devices on opposed sides of said passageway for redirecting the stripped liquid downwardly toward the passageway to afford renewed contact with said shaped structure.

2. Claim 1 wherein each of said additional surfaces has a concave curvature in its cross-sectional contour extending upstream from the point of closest proximity to said path of travel.

3. Claim 2 wherein said convex curvature has a radius of curvature of from about 0.5 to about 2.0 inches.

4. Claim 1 wherein each of said additional surfaces has a convex curvature in its cross-sectional contour extending upstream from the point of closest proximity to said path of travel.

5. Claim 4 wherein the convex curvature of said stripping devices has a radius of curvature of from about 0.5 to about 2.0 inches and the convex curvature of said additional surfaces has a radius of curvature of from about 0.4 to about 0.6 times the radius of curvature of the convex curvature of the stripping devices.

6. A process comprising sequentially contacting a moving shaped structure with liquid in excess of that which is readily and completely absorbed and forwarding the liquid-bearing shaped structure, after each of said contacts, downwardly in close proximity to a liquid stripping device oriented adjacent to and extending substantially perpendicular to the path of travel of said shaped structure, each of said stripping devices having at least one convex curvature in its cross-sectional contour extending downstream from the point of closest proximity to said path of travel.

References Cited

UNITED STATES PATENTS 1,398,043    11/1921    Rau _____ 68—205 X
2,252,755    8/1941    Bruestle _____ 117—102

ALFRED L. LEAVITT, Primary Examiner

C. R. WILSON, Assistant Examiner

U.S. Cl. X.R.

68—200; 117—120; 118—122, 123